(No Model.)

E. H. SMITH.
HARVESTER CUTTER.

No. 426,966. Patented Apr. 29, 1890.

— WITNESSES —
Dan'l Fisher

— INVENTOR —
Edwin H. Smith,
by G. & W. J. Howard,
atty.

UNITED STATES PATENT OFFICE.

EDWIN H. SMITH, OF BALTIMORE, MARYLAND.

HARVESTER-CUTTER.

SPECIFICATION forming part of Letters Patent No. 426,966, dated April 29, 1890.

Application filed January 13, 1890. Serial No. 336,763. (No model.)

*To all whom it may concern:*

Be it known that I, EDWIN H. SMITH, of the city of Baltimore, in the State of Maryland, have invented certain Improvements in Harvester-Cutters, of which the following is a specification.

The object of this invention is to effect a cheap, simple, and effective lock for the screws whereby the cutter-blades are held to the cutter-bar, as will hereinafter fully appear.

In the description of the said invention which follows reference is made to the accompanying drawings, forming a part hereof, and in which—

Figure 1:
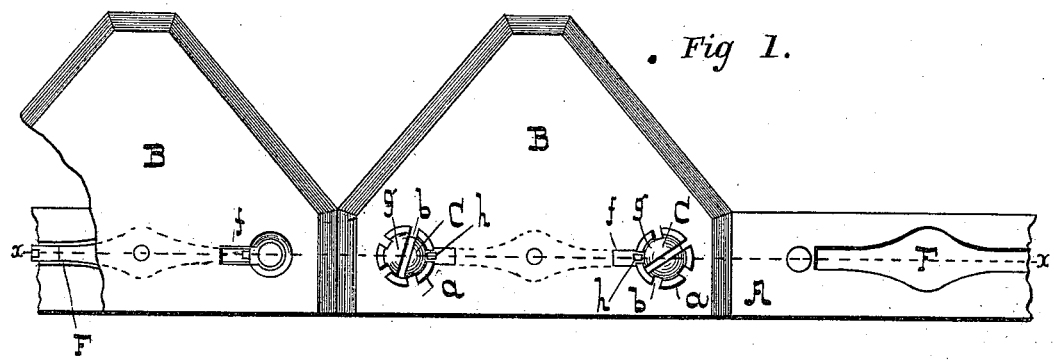
Figure 2:
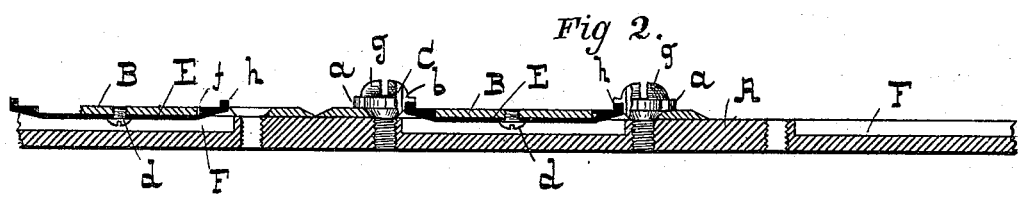

Figure 1 is a top view of a part of a harvester cutter-bar to which cutter-blades are attached in accordance with my invention. Fig. 2 is a longitudinal section of Fig. 1, taken on the dotted line $x$ $x$.

Similar letters of reference indicate similar parts in both figures.

In the said drawings, A represents the cutter-bar, and B the cutters or blades. The screws which secure the blades to the bar are denoted by C. The screw-holes in the blades are countersunk, and the lower part of the screw-heads is made conical, so as to fit the countersink. Around the conical portion of the screws is a collar $a$, having circumferential notches $b$, and above the collar is a crown $g$, provided with a cut for a screw-driver. The crown of the screws is not, however, necessary, as the screw-driver cut may be in the collar, if desired.

E E are spring-plates held to the under side of the knives and between the screws C by means of the small screws $d$. The ends of these springs are re-enforced in thickness, and the projections formed by the re-enforcement pass through slots $f$, which extend from the countersunk screw-holes. The ends of the springs are also provided with spurs $h$, adapted to enter any of the notches $b$ in the screws and lock them. In order to turn any one of the screws C, the end of the spring adjoining it must be forced down until the spur is below the upper surface of the blade.

The bar A is provided with a recess F under each of the springs E to admit of the depression of its ends, as described.

I claim as my invention—

1. In a harvester-cutter, the knife having a screw-hole and an adjacent slot, combined with a spring-plate secured under the said knife, with its end fitted with a spur, and a screw having circumferential notches into which the said spur is adapted to fit, and a knife-bar to which the knife is attached, substantially as and for the purpose specified.

2. In a harvester-cutter, a knife having two screw-holes with slots leading from them and toward each other, screws with notches in their circumference, a plate-spring secured under the said knife-blade, having its ends fitted with spurs adapted to fit into the notches in the screws, and the knife-bar to which the knives are secured by means of the said screws, all combined substantially as and for the purpose specified.

EDWIN H. SMITH.

Witnesses:
 WM. T. HOWARD,
 DANL. FISHER.